(No Model.)
G. W. McNEAR.
ELECTRIC RAILWAY.
No. 462,014. Patented Oct. 27, 1891.
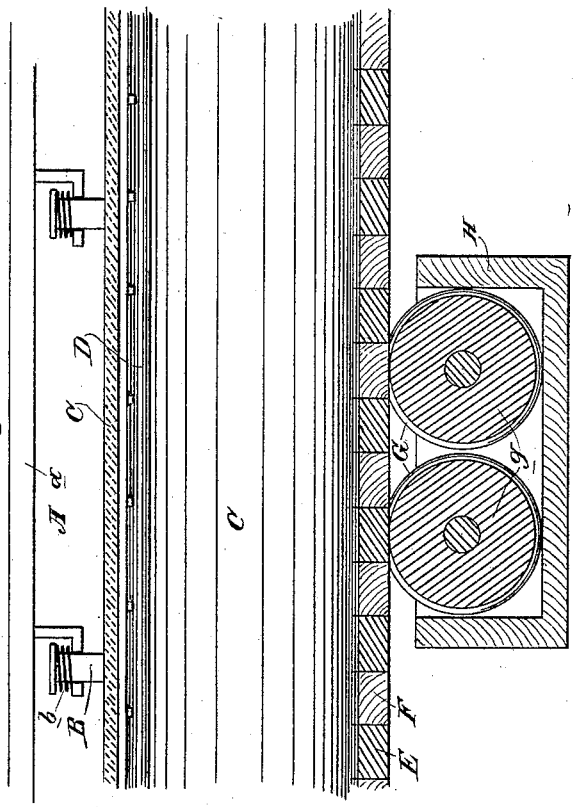
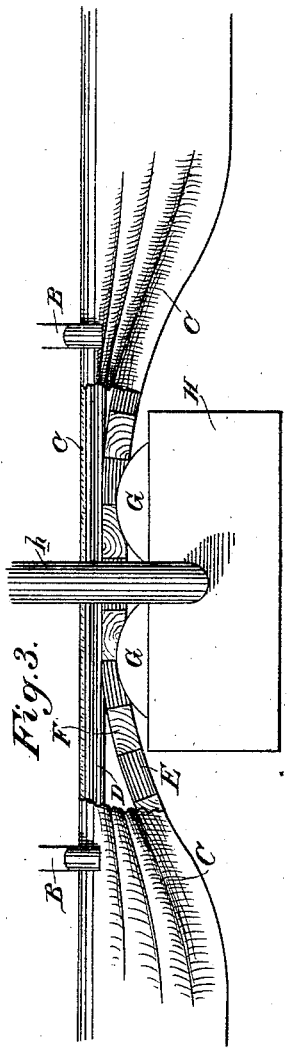
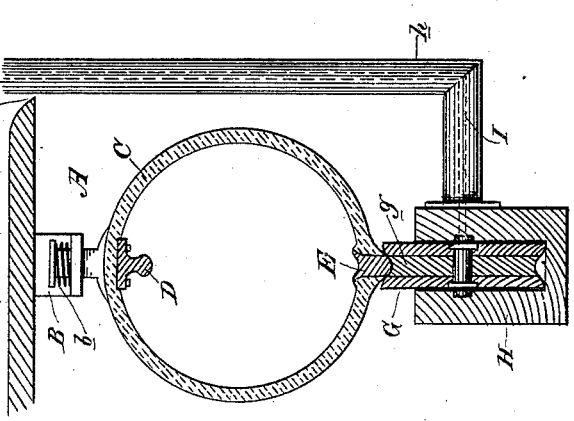
Witnesses,
Inventor,
George W. McNear
By Dewey & Co.
Attys

UNITED STATES PATENT OFFICE.

GEORGE W. McNEAR, OF OAKLAND, CALIFORNIA.

ELECTRIC RAILWAY.

SPECIFICATION forming part of Letters Patent No. 462,014, dated October 27, 1891.

Application filed October 11, 1889. Serial No. 326,729. (No model.)

*To all whom it may concern:*

Be it known that I, GEORGE W. MCNEAR, a citizen of the United States, residing at Oakland, Alameda county, State of California, have invented an Improvement in Electric Railways; and I hereby declare the following to be a full, clear, and exact description of the same.

My invention relates to the class of electric railways; and it consists in the hereinafter-described novel arrangement of the electric conductor and the means for effecting contact therewith.

The object of my invention is to thoroughly and practically insulate the electric conductor.

Referring to the accompanying drawings for a more complete explanation of my invention, Figure 1 is a vertical cross-section of a portion of a conduit or subway and the electric conductor and insulating-sack and contacts and an end elevation of the trolley-wheel and connection. Fig. 2 is a longitudinal central section of insulating-sack, conductor, contacts, and trolley-wheels. Fig. 3 is a side elevation showing the trolley-wheels raised and the sack broken away partially to show the contact with the conductor.

Although my invention is applicable to all kinds of electric conductors, whether arranged overhead or in subways, I have here, for the sake of convenience, shown it in its most applicable form in a subway or conduit.

A is the conduit, having the usual continuous slot $a$ for the passage of the trolley-arm or shank. Dependent from the under side of the top of the conduit are brackets B, arranged at suitable intervals throughout the line of the conduit, said brackets being preferably so mounted as to be controlled by a spring $b$, whereby they may yield, when necessary, to conform to circumstances. These brackets may be of insulating material or they may be properly insulated by any suitable means, as by the interposition of glass.

The brackets carry an insulating-sack C, which is in the form of a closed tube of any suitable cross-section, and is made of some suitable insulating material which is sufficiently flexible in its nature or is so constructed as to allow it to be collapsed. I would in this connection suggest the use of rubber for this sack, though I do not confine myself to this material, as other materials or constructions might be employed, provided they have the essentials of collapsibility and insulating properties and of expanding again when the collapsing power is removed. Within and wholly confined by this insulating-sack (here shown as at the top thereof) is the metallic electric conductor D, which, together with the insulating-sack, extends the whole length of the conduit. This conductor, though it may be of any suitable cross-section, I have here shown as in the form approximately of an inverted T-rail. The under surface of the electric conductor within the sack is exposed, so as to form electrical contact with the devices below.

In the lower portion of the sack are carried the contact-pieces, which consist of independent sections E of conducting material, said sections being separated by sections F of insulating or non-conducting material, whereby throughout the whole length of the sack there is a series of alternating electrical contact-sections and insulating-sections. These sections are all carried by and open through the wall of the sack, their upper surfaces being exposed within the sack and their outer surfaces being exposed without it, so that said outer surfaces can come in contact with the surface of the trolleys G. The trolley consists of a wheel having its center face $g$ made of conducting material and adapted to come in contact with the sections E F of the sack and its side faces formed of plates of non-conducting or insulating material, the wheel being mounted within an insulating box or casing H, carried by the arm or shank $h$, which extends upwardly through the slot $a$ of the conduit and is to be connected with the car above in such a manner that it can be raised and lowered. This arm or shank is hollow and through it passes the conducting-wire I, one end of which is in electrical contact with the trolleys and the other end passes up through the arm and is suitably connected with the motor in the car above. The trolley-wheels are so arranged that in the travel of the car one or the other of said wheels shall be in constant contact with one of the electrical sections E in the sack above.

The operation of the device is as follows:

When the shank or arm $h$ is elevated, which motion it is adapted to have by means of suitable devices on the car above, its trolleys G, pressing up against the sections E F in the bottom of the insulating-sack, collapse said sack sufficiently to carry said sections up into direct contact with the electric conductor D in the upper portion of the sack. By these means the electric current passes from the conductor D into one of the trolleys and thence through the conducting-wire I to the motor above, and as the car progresses one or the other of the trolleys is in constant circuit with the conductor above and the current must pass into the trolleys, having no other outlet, the intervening non-conducting sections F preventing it from passing through more than one of the sections E. The electric conductor, being entirely within the insulating-sack C, will not lose any of its electric fluid, so that there is no wastage such as is common in electric conductors, especially those which are mounted or carried in underground conduits, the difficulty in this latter system being to successfully insulate the conductor. As the trolley-wheels move along and relieve the sack of their pressure the sack expands again to its normal condition.

It is not essential that my conductor should be in the top of the insulating-sack, nor that the contact-sections E shall be in the bottom, for they may be otherwise arranged, provided they are so disposed relatively that upon collapsing the sack they shall be brought into electrical contact.

I am aware in electric railroads of an electric conductor which is mounted wholly within a tube of rubber, said tube having a continuous slit for the insertion and passage of the trolley or other contact-shank, which spreads the rubber as it passes, the rubber closing in behind it, and I am also aware of continuous flexible strips placed in a roof shape above the conductor for protecting it from water, the passing contact-arm traveling between the strips; but in these cases the contact-arm actually enters the insulating-casing, which must temporarily open to receive it, while in mine nothing enters the sack, so that the conductor is permanently and continuously confined and kept from any contact with water or other extraneous objects or substances.

Having thus described my invention, what I claim as new, and desire to secure by Letters Patent, is—

1. In electric railways, a flexible sack or tube carrying an electric conductor, and contacts diametrically opposite to the conductor and arranged to be maintained normally out of contact with the conductor by gravity, substantially as herein described.

2. The combination, with an electric conductor and an insulating-envelope inclosing the conductor, of contacts located inside and outside of the envelope and arranged to be maintained normally out of contact with the conductor by gravity, substantially as herein described.

3. The combination, with a conductor and a flexible tube or equivalent insulating-envelope inclosing the conductor, of flexible conducting-strips attached to the lower portion of the tube or envelope, and a trolley or shoe adapted to raise the conducting-strips into contact with the conductor, substantially as set forth.

4. In electric railways, a flexible sack or tube suspended from a support and carrying along one of its inner surfaces a conductor, electrical contacts fitted to the sack or tube directly opposite to the conductor, and a moving carrier engaging the contacts to compress the sack or tube and force the contacts into electric engagement with the conductor, said sack or tube automatically expanding to return the sack or tube and contacts to their normal position after the passage of the carrier.

5. In electric railways, a collapsible sack or tube, a conductor secured along one of the inner surfaces of the same, electric contacts in said sack or tube opposite to the conductor and projecting through opposite walls of the sack or tube, said contacts arranged to be maintained normally out of contact with the conductor by gravity, and a trolley engaging the outer surface of the contacts and compressing the sack or tube to bring the contacts into electric engagement with the conductor, said sack or tube automatically expanding after the passage of the trolley and returning the sack or tube and contacts to their normal positions.

6. In electric railways, a suspended sack or tube of flexible material carrying at opposite sides a conductor and electric contacts, and a moving carrier adapted to travel along said contacts and to compress the sack or tube during its passage, whereby contact is made with the conductor, said sack or tube expanding after the passage of the carrier and automatically returning to its normal condition.

7. In electrical railways, a suspended sack or tube carrying along one of its inner walls a conductor, a series of alternating electrical contact-sections in the wall of the sack or tube opposite to the conductor, and a moving vehicle carried by the car and in electric connection with the motor, said sack or tube being composed of flexible material adapted to be collapsed by the moving vehicle, whereby electrical contact is made, and to expand and return to its normal position after the passage of the vehicle.

In witness whereof I have hereunto set my hand.

GEORGE W. McNEAR.

Witnesses:
JAMES L. KING,
ANDREW P. MOSELEY.